No. 682,653. Patented Sept. 17, 1901.
C. R. WALKER.
SOAP DELIVERY ATTACHMENT FOR WATER PIPES.
(Application filed Dec. 26, 1900.)
(No Model.)
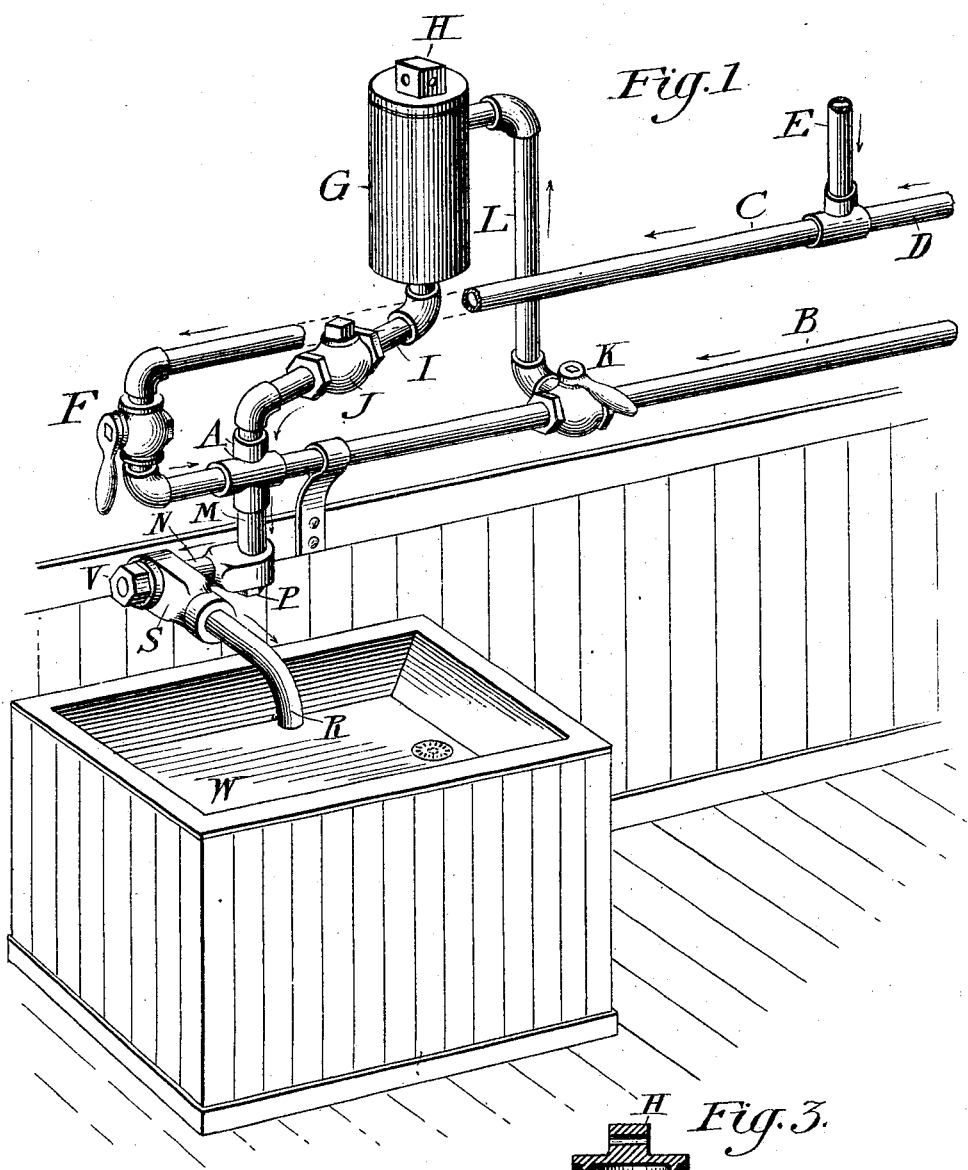
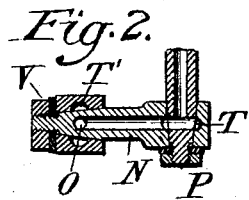
Witnesses:
D. W. Edelin.
Chas. H. Baker.
Inventor:
Charles R. Walker.
By Stebbins & Wright.
Attys.

UNITED STATES PATENT OFFICE.

CHARLES R. WALKER, OF JAMESTOWN, NORTH DAKOTA.

SOAP-DELIVERY ATTACHMENT FOR WATER-PIPES.

SPECIFICATION forming part of Letters Patent No. 682,653, dated September 17, 1901.

Application filed December 26, 1900. Serial No. 41,082. (No model.)

*To all whom it may concern:*

Be it known that I, CHARLES R. WALKER, a citizen of the United States, residing at Jamestown, in the county of Stutsman and State of North Dakota, have invented a certain new and useful Soap-Delivery Attachment for Water-Pipes, of which the following is a specification.

The object of this invention is the provision of means in connection with water-pipes, such as are connected with the ordinary boiler used in kitchens and with an outside water-supply, whereby soap or water mixed or impregnated with soap may be delivered from a faucet.

My invention consists in certain novelties of construction and combinations of parts hereinafter set forth and claimed.

The accompanying drawings illustrate an example of the physical embodiment of my invention constructed according to the best method I have devised for the application of the principle.

Figure 1 is a perspective view of the entire appliance. Fig. 2 is a sectional view of the nipple of the faucet and the parts connected therewith. Fig. 3 is a sectional view of the soap-chest.

Referring to the figures, the letter A designates a double-T or four-way coupling; B, a hot-water-supply pipe; C, a cold-water-supply pipe; D, a pipe adapted to be connected with a boiler; E, a pipe connected with a city main or other source of water-supply; F, a cut-off valve of well-known construction located in the cold-water-pipe line; G, a soap-chest; H, a screw plug and gasket for the top of the chest, the top being square and having holes for the insertion of a bar to turn the plug; I, a pipe leading from the bottom of the soap-chest to the double-T coupling; J, a check-valve of any well-known construction opening toward the double-T coupling; K, a three-way valve of known construction located in the hot-water line; L, a pipe leading from the three-way valve to the upper part of the soap-chest; M, a pipe having a tapering end and secured to the double-T coupling; N, a nipple having a tapering end and a longitudinal passage therein; O, a hole through the tapered portion of the nipple; P, a nut and washer by which the nipple is adjusted relative to the end of a pipe M, as shown in Fig. 2 of the drawings; R, the nozzle or delivery-pipe of the faucet; S, a casting which forms a joint with the end of the nipple; T, an enlarged space in the pipe N adjacent its union with the pipe M; T', an enlarged space in the casting S adjacent its union with the nipple; V, a nut and washer by which the casting S is adjustably secured to the nipple, and W is a sink or other receptacle.

Parts M, N, S, and R constitute what may be called a "faucet." The casting S can be rotated about the nipple in a vertical plane and the nipple rotated about the pipe M in a horizontal plane, and by reason of the enlarged spaces T and T' an open passage for water still be preserved. These movements of the parts allow the nozzle to be brought to any desired position relative to the area of the sink. The check-valve opening downwardly prevents water from the double-T coupling passing upwardly to the soap-chest.

To deliver cold water from the faucet, the valve F is turned. To deliver hot water, the valve K is suitably manipulated, and to deliver soap or water mixed with soap the valve K is turned so as to allow water to pass from pipe B to the top of the soap-chest and thence downwardly through the check-valve to the nozzle.

It is obvious that in practice certain modifications in construction and combination of the parts may be introduced without constituting a substantial departure and which will be included within the scope of the claims.

What I claim, and desire to secure by Letters Patent, is—

1. The combination in a soap-delivery attachment of a double T A; a faucet connected to one branch of the double T; a hot-water pipe B connected to another branch of the double T, a three-way valve K in the pipe B; a cold-water pipe C connected to a third branch of the double T; a valve F in pipe C; a soap-chest G; a pipe L joining the soap-chest and pipe B; a pipe I leading from the soap-chest to the double T; and a check-valve in pipe I.

2. The combination in a soap-delivery attachment, of a faucet; a hot-water pipe in communication with the faucet; a three-way valve in the hot-water pipe; a cold-water pipe C in communication with the faucet; a valve F in the cold-water pipe; a soap-chest G; pipe L uniting the hot-water pipe and the soap-chest; and a pipe I having a check-valve leading from the soap-chest to the faucet.

3. The combination in a soap-delivery attachment, of a double T A; hot and cold water supply pipes united to the double T; a faucet in communication with the hot and cold water pipes by way of the double T; a soap-chest; and means for passing water from one of the pipes through the soap-chest to the faucet.

4. The combination in a soap-delivery attachment, of a water-supply pipe; a three-way valve in the water-pipe; a soap-chest; a faucet; a pipe uniting the three-way valve and the soap-chest; and a pipe leading from the soap-chest to the faucet.

5. The combination in a soap-delivery attachment, of a faucet; a hot-water pipe; a cold-water pipe; a three-way valve K in one of the pipes; a valve F in the other pipe; a soap-chest; a pipe leading from valve K to the soap-chest; and a pipe leading from the soap-chest to the faucet.

6. The combination in a soap-delivery attachment, of a nipple N; casting S; nozzle R; pipe M; water-pipe B communicating with pipe M; a three-way valve K in pipe B; a soap-chest; a pipe uniting valve K and the soap-chest; and a pipe I leading from the soap-chest to the pipe M, said pipe M also being in communication with nozzle R.

7. The combination in a soap-delivery attachment, of a faucet; a hot-water pipe; a cold-water pipe; a soap-chest; a pipe leading from one of the water-pipes to the soap-chest; a cut-off in the other pipe; and a pipe leading from the soap-chest to the faucet.

8. The combination in a soap-delivery attachment, of a water-supply pipe; a faucet in communication with said water-supply pipe; a soap-chest; a pipe leading from the water-supply pipe directly to the soap-chest; a pipe leading from the soap-chest to the faucet; and means in connection with the pipes for transmitting water from the water-supply pipe through the soap-chest to the faucet.

In testimony whereof I affix my signature in presence of two witnesses.

CHARLES R. WALKER.

Witnesses:
C. B. BROWN,
N. H. MARSHALL.